United States Patent [19]
Heinrich

[11] 3,753,822
[45] Aug. 21, 1973

[54] METHOD OF MAKING A MULTI-LAYER OPTICAL ISOLATION

[75] Inventor: Philip L. Heinrich, Fairfield, Conn.

[73] Assignee: Laser Optics, Inc., Danbury, Conn.

[22] Filed: Mar. 25, 1971

[21] Appl. No.: 128,354

[52] U.S. Cl................................. 156/101, 156/250
[51] Int. Cl............................................. B32b 17/00
[58] Field of Search...................... 156/250, 99, 100, 156/101, 106; 161/35, 6

[56] References Cited
UNITED STATES PATENTS

| 3,031,351 | 4/1962 | McIlvaine | 161/6 |
| 1,117,965 | 11/1914 | Becker | 156/250 |
| 2,053,173 | 9/1936 | Astima | 156/250 |

FOREIGN PATENTS OR APPLICATIONS

| 548,027 | 9/1942 | Great Britain | 156/250 |

Primary Examiner—Douglas J. Drummond
Attorney—Philip M. Shaw, Jr.

[57] ABSTRACT

An optical reflector structure, with broad band rejection characteristics, for isolating a particular band of wavelengths of interest. The optical reflector comprises a stack of flat substrates, each one of which has a coating, which is reflective at the bandwidth of interest, disposed along at least one of its faces. The optical reflector structure is interposed into a beam of light with the planes of the coatings at a predetermined angle to the beam of light. In one embodiment the predetermined angle is 45°. The bandwidth of interest is reflected by a first set of the coatings to another set of coatings while the remaining light is absorbed by the substrates or opaque coatings on the substrates in one embodiment or by a coating of light-absorbing material disposed behind the reflective coating relative to the incident light in another embodiment.

3 Claims, 8 Drawing Figures

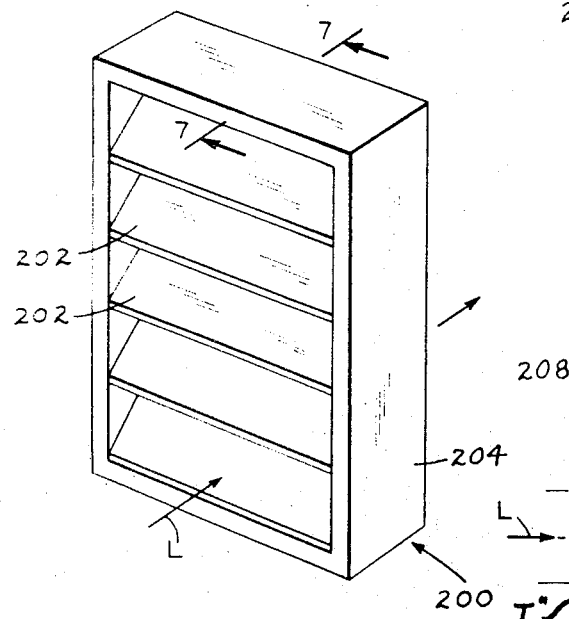
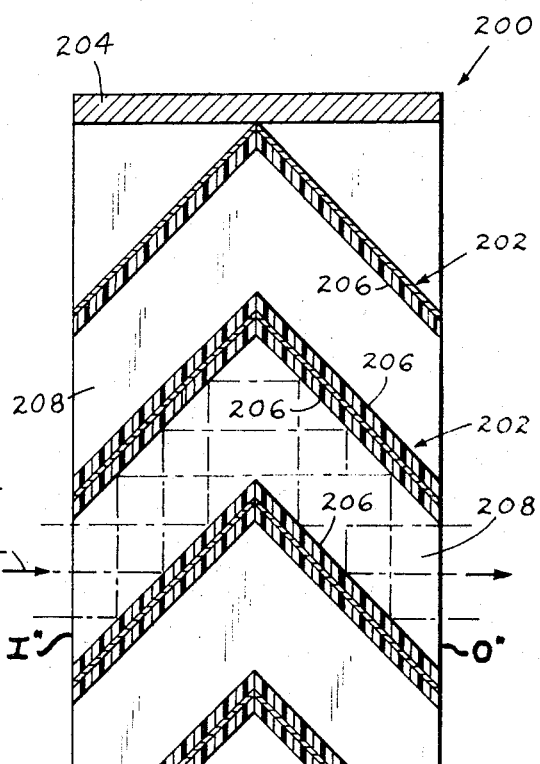
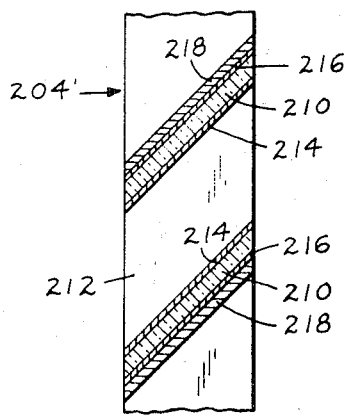

3,753,822

METHOD OF MAKING A MULTI-LAYER OPTICAL ISOLATION

BACKGROUND OF THE INVENTION

This invention relates to optical reflector structures and more particularly to a reflector structure for use as a filter to isolate a particular band of wavelengths of interest. In studying light and in employing light to study other phenomenon, it is often important to be able to isolate a particular frequency of light, of a small bandwidth centered around a particular frequency, and eliminate all other light from interfering with the desired frequency.

In the visible light spectrum (between 3,500 A. and 7,500 A.) there are numerous materials which may be interposed into the path of a beam of white light to isolate a particular bandwidth. These materials have a high transmission characteristic at the bandwidth of interest and absorb or reflect all other bandwidths. This is also true in the infrared spectrum (above 7,500A.). However, when one wishes to investigate the ultra-violet spectrum (below 3,500A.) there are very few materials which may be employed as band pass filters which concurrently have a broad band rejection characteristic, i.e., that reject all frequencies other than the one which is under study. Furthermore, those materials which may be employed in the mid ultra-violet range (around 3,000A.) generally have a low transmission characteristic. Therefore, a great deal of the incident energy at the particular bandwidth of interest is absorbed by the filter. A great increase in the intensity of the incident light is required to obtain the necessary output intensity at the bandwidth of interest.

In the range below 3,000A., there are few materials which can serve as satisfactory broad-band isolation filters. One prior device, rather than employ a material which transmits only the bandwidth of interest and rejects all others, employs a multi-layer thin film system deposited along one surface of a plate of absorbant black glass. The film system is reflective at the bandwidth of interest, so that when the black glass is tilted at a 45° angle to the incident light, the light reflected from the multi-layer thin film system is principally light at the bandwidth of interest. The remainder of the light will travel through the multi-layer film system and be absorbed by the black glass. A number of black glass reflective coating supports, arranged in a parallel spaced-apart relationship are used to reflect the light several times.

There are several disadvantages to such a filter. Black glass is exceptionally expensive compared to other light-absorbing materials. The plates of the device are thick relative to the distance over which the reflected light travels between any two parallel, reflective film surfaces, thereby reducing the available aperture. This also causes the filter to be bulky and unsuitable for many applications requiring that the filter use a minimum of space.

A still further disadvantage of the black glass filter described above is that the reflective surfaces are unprotected from the environment. They are thus subject to corrosion, scratching, and the like. Furthermore they are unprotected against even normally harmless natural effects, such as high humidity, which may seriously alter the optical properties of the thin film system.

SUMMARY OF THE INVENTION

The invention comprises an optical reflection filter having at least two plane surfaces reflective at a particular bandwidth of interest, but substantially transparent at wavelengths outside of the bandwidth of interest, which are supported in a parallel, spaced apart relationship. They are oriented at a predetermined angle with respect to an incident beam of light such that light at the bandwidth of interest is reflected from a first one of the reflective surfaces to the other of the reflective surfaces. Behind each reflective surface, relative to the beams of incident and reflected light, is a layer of opaque, light-absorbing material which is thin compared to the distance between the reflective surfaces. Light outside of the bandwidth of interest is absorbed by the material while substantially all the light in the bandwidth of interest passes through the filter after being reflected from the first to the second reflective surfaces.

In a first preferred embodiment of the invention, a multi-layer, thin film coating of dielectric material or metal plus dielectric material for reflecting the bandwidth of interest is disposed along at least one face, and preferably both faces, of a plane substrate of a material transparent in the ultra-violet range, such as fused silica or crystalline quartz. A number of such substrates are assembled with their multi-layer coatings parallel to and substantially adjacent one another. A layer of opaque absorbing epoxy is disposed intermediate the adjacent multi-layer reflective coatings to secure the two substrates to one another. This process is repeated to form a stack of coated substrates. The substrates are then cut into slabs at a predetermined angle such as 45° to the planes of the reflective coatings. The distance between adjacent cuts is greater than the thickness of any one of the substrates of transparent material. The reflective coatings are protected from damage due to handling or from harmful elements in the atmosphere by being sandwiched between the transparent substrates.

Two such slabs are placed back-to-back to form a chevron. Light which is incident on the first face of the isolation filter is reflected at least four times before exiting from the chevron, thereby substantially reducing the intensity of light at unwanted frequencies. If each one of these reflective coatings is approximately 99 percent reflective, substantially the entire intensity of light at the bandwidth of interest is transmitted through the isolation filter.

While the bandwidth of interest is reflected off each one of the multi-layer reflective coatings, the remainder of the light passes through the reflective coatings and is absorbed by the layers of opaque, light-absorbant epoxy which adhere one substrate to the next substrate.

In another preferred embodiment of the invention, the reflective surfaces are deposited on thin, opaque, light-absorbing, plane substrates. The substrates are arranged in a parallel spaced-apart relationship, separated by an air gap substantially greater than the thicknesses of the substrates, and with reflective surface of one substrate facing the reflective surface of another substrate. A plurality of such coated substrates are mounted so as to comprise a louver with respect to an incident beam of light. The substrates are arranged at a predetermined angle with respect to the incident beam of light. A particularly efficient angle for most applications of this embodiment is 45°. Two such louvers are placed back-to-back to form a chevron. Light at the bandwidth of interest is passed through the filter by multiple reflections off of the reflective surfaces while light outside of the bandwidth of interest passes through the surfaces to be absorbed by the substrates.

In both embodiments the layers of light-absorbing material are thin relative to the distance between the surfaces over which the reflected light must travel. This constructional feature gives the filters a relatively large aperture compared to their overall dimensions. A correlative advantage is that the filters can be compact.

Still another advantage of filters constructed according to the invention is that the substrate and light-absorbing materials are far less expensive than black glass.

It is thus an object of this invention to provide a chevron design reflector structure, having broad band rejection characteristics, for use as an isolation filter.

It is another object of this invention to provide an isolation filter which has a high transmission factor at the bandwidth of interest and a high signal-to-noise ratio.

It is a further object of this invention to provide a chevron design reflector structure which eliminates the need for use of high cost absorbant mediums such as black glass.

It is still a further object of this invention to provide a chevron design reflector structure utilizing multiple internal reflections to isolate the bandwidth of interest. These, further, and other objects of the invention will be more fully explained and described when viewed in conjunction with the drawings in which:

BRIEF DESCRIPTIONS OF THE DRAWINGS

FIG. 6 is a perspective view of still another embodiment of the invention;

FIG. 7 is an enlarged vertical view in section, taken generally along the line 7—7 in FIG. 6;

FIG. 8 is a vertical view in section of a portion of still another embodiment of the invention.

DETAILED DESCRIPTION OF CERTAIN PREFERRED EMBODIMENTS OF THE INVENTION

Figure 1:
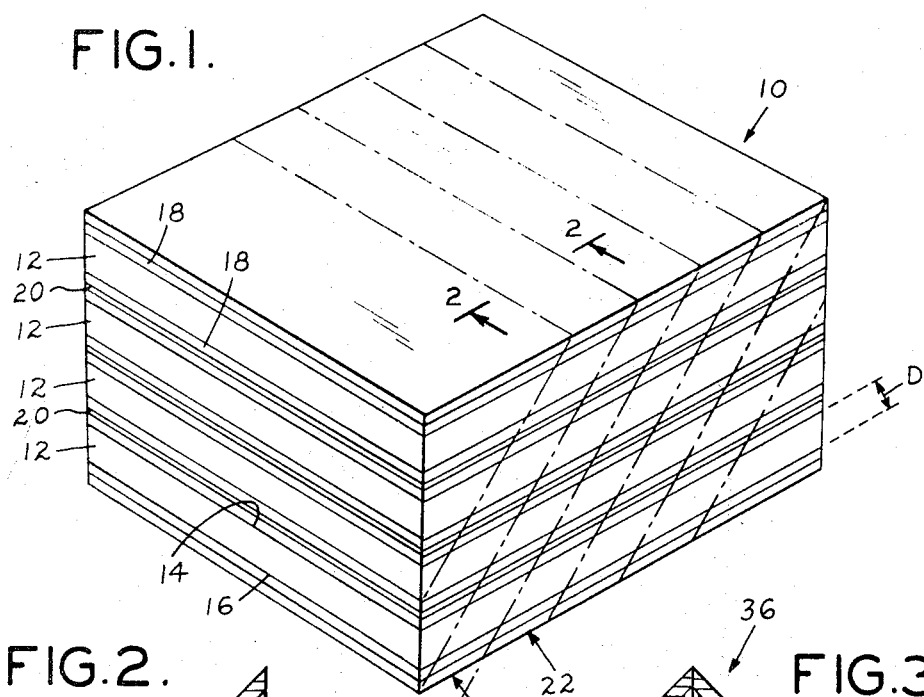
FIG. 1 is a perspective view of a stack of coated substrates affixed to one another, with 45° cut lines shown in phantom lines.

Referring now more particularly to FIG. 1, there is shown a stack 10 of a multiplicity of substrates 12, each of which is transparent at the wavelength of interest. Each one of the substrates 12 has a pair of plane, parallel sides 14 and 16 separated by a perpendicular distance D.

At least one of the parallel plane sides of each one of the substrates 12 of material has a coating 18 deposited thereon. The coating 18 is multi-layer, thin film system which reflects only a particular bandwidth of interest. The films are made of layers of dielectric material or metal plus dielectric material, each layer having a thickness which is one or more predetermined fractions of the wavelength of interest. Such systems are known in the art and are described in technical detail in a book entitled "Optical Properties of Thin Solid Films," pages 207–256 by O.S. Heavens, printed by Dover Publications, Inc., New York.

Figure 2:
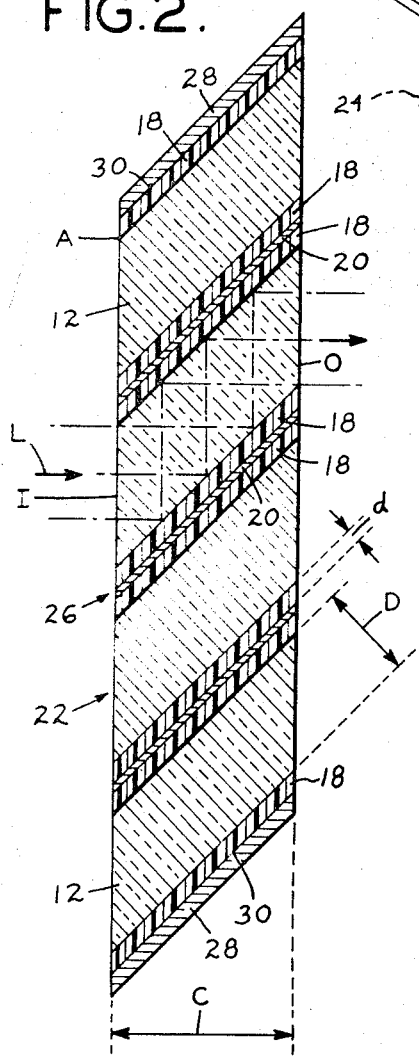
FIG. 2 is an enlarged vertical view in section of a slab cut from the stack of FIG. 1 taken generally along the line 2—2 of FIG. 1.

In FIG. 2, the coating 18 is illustrated as being deposited on both of the parallel plane sides 14 and 16. The deposition of the coating 18 on the substrate 12 may be done in any of several ways known in the art such as by resistance evaporation, electron beam deposition, laser evaporation, or plasma deposition. The coating is built up layer by layer, with the thickness of each layer being continuously monitored during deposition. For purposes of illustration, the thickness of the coatings 18 shown in the drawings are greatly exaggerated.

The coated substrates 12 of material are then affixed to one another by a thin layer 20 of opaque, light-absorbing epoxy. The layer 20 of absorbing epoxy may be applied as a bead between the reflective coatings 18 on the adjacent, parallel plane sides 14 and 16 of adjoining substrates 12. By compressing the stack 10 the bead of absorbing epoxy is squeezed into a thin layer 20 as shown in the drawings.

The stack 10 of coated sheets is then cut into a number of slabs 22 at a 45° angle from the plane of the parallel sides 14, 16 and the coatings 18 along lines 24—24 as illustrated in FIG. 1. The relative orientation of the substrates 12, the coatings 18, and the layers 20 of light-absorbing epoxy are illustrated in FIG. 2 which depicts a two reflection isolation filter having a plurality of coating-epoxy-coating interfaces, generally labeled 26. A layer 28 of light-absorbing material covers each of the outside end faces 30 of the slab 22.

With each one of the substrates 12 oriented at a 45° angle to an incident light beam L and each having two reflective coatings 18 of a thickness each equal to $d$, the thickness C of the slab 22 should preferably be equal to or greater than a distance of $\sqrt{2}$ (D + 2d + the thickness of one layer 20 of epoxy) to prevent light from passing through the filter without being reflected. If the thickness C were less than this distance, light which entered at an uppermost point A on the upper surface of a given substrate 12 would pass through the isolation filter without being reflected or absorbed. Hence, all frequencies would exit, thereby interfering with the isolated bandwidth.

When the thickness C is greater than $\sqrt{2}$ times the combined thickness of the elements D + 2d + the thickness of layer 20 incident light will pass through the input face 1 and be reflected upward from each of the lowermost coating 18. That portion of the light which is reflected from the lowermost coatings 18 will be of a bandwidth centered around the frequency of interest, which is the frequency at which the multi-layer thin reflective film coatings 18 are reflective. The remainder of the light will pass through the coatings 18. The layers 20 and 28 of opaque, light-absorbing material will absorb that light which is passed through the coating 18.

Because the coatings 18 are approximately 99 percent reflective at the bandwidth of interest, virtually the entire intensity at the desired bandwidth will be transmitted, yielding a high transmission through the substrate 12 to each of the upper coatings 18. There will still be a background "noise" or light of undesired frequency which is reflected. Experiments in multilayer thin film systems have demonstrated that this unwanted portion is approximately 4–6 percent of the peak value of the reflected light.

The once reflected light is then reflected again into a horizontal plane at the upper coatings 18 and the isolation process is repeated. The background noise of 4–6 percent will become approximately equal to 0.16 to 0.36 percent, while the transmission of the bandwidth of interest will be $(0.99)^2$ or approximately 98 percent. Thus the filter is highly effective in rejecting all light except at the bandwidth of interest.

The light which exits from the isolation filter illustrated in FIG. 2 is displaced laterally. Because the isolation filter comprises a stack of coated sheets the lateral displacement of the entire beam will be approximately equal to the thickness of one of the elements. By adding more substrates 12 having reflective coatings the aperture size of the filter can be increased.

In certain circumstances it is desirable to eliminate all lateral displacements and simultaneously provide a still higher rejection characteristic. This may be accomplished by the embodiment illustrated in FIG. 3 in which two isolation filters 32 and 34 of the type described in reference to FIG. 2 are put back-to-back with the coated, epoxied interfaces 26 substantially adjacent to one another and with each interface of one filter substantially at right angles to the corresponding interface of the other filter. This produces a chevron design isolation filter generally labeled 36.

While the coated, epoxied interfaces 26 of the subfilter 32 are shown as being matched with those of the subfilter 34, such need not always be the case. A mismatch resulting from the lateral displacement of the two stacks 10 relative to one another will result in a loss of energy because the incident energy may be reflected more than four times, but this need not have serious consequences. Because the transmission is initially at approximately 99 percent, repeated reflections will only lower the transmitted energy by a small amount.

The thickness C of the slabs 22 of each one of the isolation filters, however, must remain greater than $\sqrt{2}$ (D + 2d + the thickness of the layer 20 of glue) in order to prevent a leakage of white light through the filter and ensure at least two reflections per isolation filter or a minimum of four reflections and absorptions for an incident light beam passing through the filter 36.

This is illustrated diagrammatically by the incident light beam L shown entering the input face I of subfilter 32, being twice reflected in periscope fashion, exiting the output face O of subfilter 32, entering the adjacent input face I' of subfilter 34, being twice reflected in periscope fashion and finally exiting the filter 36 from the output face O' of subfilter 34. Because the input faces I and I' and the output faces O and O' are all parallel to one another and because the two isolation filters are affixed to one another along the adjacent output O and input I' interfaces by means of transparent cement or by an external frame (not shown), all light which enters perpendicular to the input face I of the first isolation subfilter 32 will exit perpendicular to the output face O' of the second isolation subfilter 34 and there is no resulting substantial lateral displacement of the incident light beam. Furthermore, the only distance which will not be effectively used as a filter is the uppermost, non-reflecting portion which is approximately equal in height to 2 D. Therefore, the size of the filter for any given incident light beam is only slightly larger than the size of the light beam.

Figure 3:
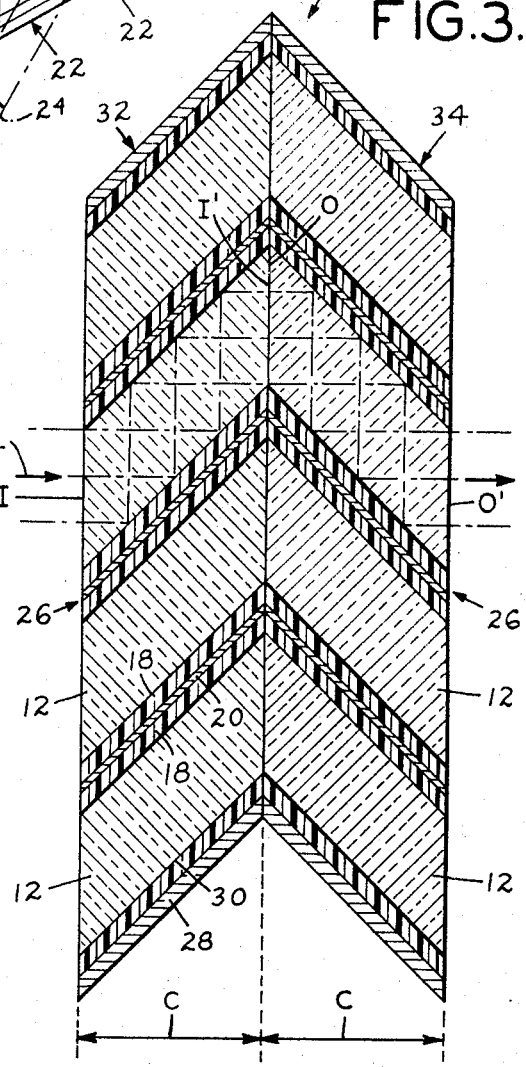
FIG. 3 is a vertical view in section of a chevron-design isolation filter according to one embodiment of the invention.

The reflection and rejection characteristics discussed above in reference to the two reflection embodiment of FIG. 2 apply with even greater significance to the four reflection embodiment of FIG. 3. Four reflections of 99 percent of the bandwidth of interest at each reflection mean that $(0.99)^4$ or approximately 96 percent of the bandwidth of interest will pass through the filter. In contrast, if only 4 percent to 6 percent of the light at undesired frequencies is reflected each time, then only $(0.04)^4$ to $(0.06)^4$ or .00026 to 0.0013 percent of this "noise" will pass through the filter and the rest will be absorbed by the layers 20 and 28.

Two, four reflection filters 36 may be placed back-to-back to form an eight reflection filter (not shown). In such an eight reflection embodiment $(0.99)^8$ or approximately 92 percent of the bandwidth of interest will pass through the filter while only $(0.04)^8$ to $(0.06)^8$ or 0.0000000007 to 0.00000002 percent of the undesired light will pass through the filter.

Although embodiments having only two, four and eight reflections are described above, other embodiments can have more reflections where even greater selectivity is required. Beside adding more four reflection filters in back-to-back relationship this result may also be achieved by a design in which the slab thickness C is larger, the thickness D of the substrates 12 is smaller, or by appropriate changes of both C and D depending on the particular application of the filter.

In order to gain a higher rejection characteristic, and in those instances when a narrower bandwidth is required, a supplementary narrow band rejection filter may be superimposed over the output surface O' of the second isolation filter 34. In general, the requirements for such a narrow band rejection filter are that it have a high percentage transmission over the bandwidth of interest and a very high rejection over a broad band area on either side of the bandwidth of interest.

Figure 4:
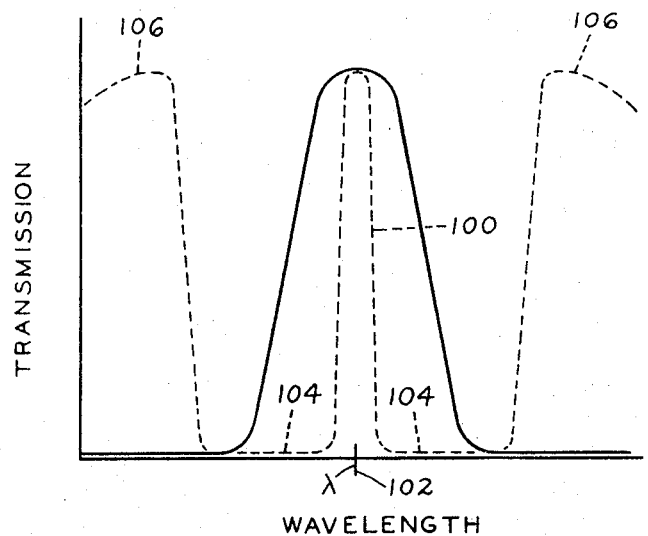
FIG. 4 is an illustration of the transmission characteristics of the isolation filter of the embodiment of FIG. 3, shown in solid line fashion, and the rejection characteristic of a narrow band output filter, shown in dotted line fashion.
Figure 5:
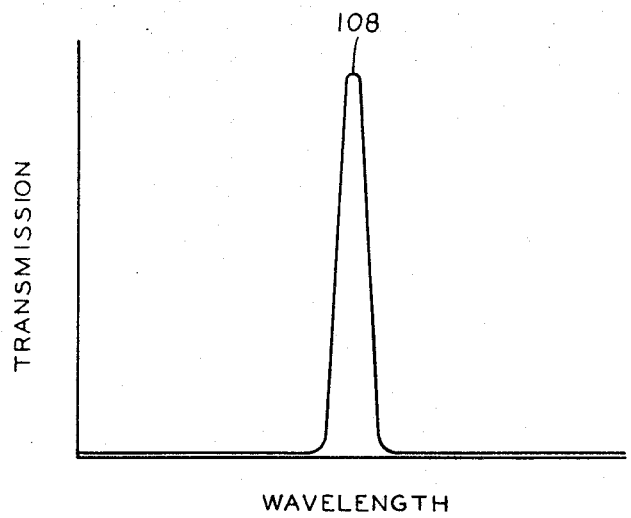
FIG. 5 is a diagrammatic representation of the transmission characteristic resulting from the superposition of the transmission characteristics shown in FIG. 4.

Referring now more particularly to FIG. 4 the transmission characteristics of a typical narrow band rejection filter (shown in dotted line fashion) and of the filter 36 (shown in solid line) are illustrated. The narrow band rejection filter has a substantially spike-shaped band pass region 100 centered around a bandwidth of interest ( $\lambda$ ) 102. It is a band rejection filter for a small area 104 outside of the bandwidth of interest 102 and will be a band pass filter for the remaining portion 106 of the spectrum. However, because the remaining portion of the spectrum has already been removed by the isolation filter 36 the resultant transmission curve will be a superposition of the two transmission curves, or a spike 108 as shown illustratively in FIG. 5.

In choosing the substrates 12, a substance which has a high transmission over a broad band should be chosen. The coatings should be high reflection, low loss coatings in the bandwidth of interest. In the ultra-violet range typical substates may be fused silica, crystalline quartz or calcium fluoride. Typical coatings may be alternating layers of magnesium fluoride and aluminum oxide, or sodium fluoride, thorium fluoride, and cryolite. In general, alkyline halides serve as extremely effective coating substances. Silicon dioxide, zirconium dioxide, and aluminum oxide may also be employed.

The embodiments of the present invention described above are not limited to the ultra-violet range but may also be employed in the visible and infrared range. For such applications germanium, silicon and glass substrates are preferred. In the visible spectrum coatings of zinc sulphide, magnesium fluoride, titanium dioxide, zirconium oxide, and silicon dioxide may be employed while in the infrared range coatings of alternating layers of germanium and magnesium fluoride, or germanium and zinc sulphide may be employed.

In manufacturing approximately a one inch square by one-half inch thick isolation filter, as is often called for in the trade, a substrate having a thickness D of approximately 0.040 – 0.080 inch may be employed. The slab thickness C should be greater than this to allow for the thickness of the coatings 18 and the layers 20 of opaque, light-absorbing epoxy as discussed above. A chevron-design isolation filter of the type described in reference to the embodiment of FIG. 3 accordingly has a typical thickness of 0.30 to 0.50 inch.

In some embodiments, the thin film coatings 18 may be designed to act as polarizers and the filter becomes both an isolation filter and a polarizer.

Referring now more particularly to FIG. 6 an air gap optical isolation reflection filter 200 according to one embodiment of the invention is shown as comprising a plurality of plane substrates 202 fitted within a case 204. The plane surfaces of the substrates 202 are oriented at angles of 45° to the vertical planes of the front and rear faces of the filter. The substrates 202 are arranged within the case 204 to form a double sided louvre or chevron design similar to that discussed above in reference to the filter 36 shown in FIG. 3.

As shown more clearly in the enlarged vertical section view of FIG. 7 each substrate 202 has a reflective coating 206 deposited on at least one of its plane surfaces. The substrates intermediate the top and bottom substrates of the filter have reflective coatings 206 on both plane surfaces. The reflective coatings 206 are reflective only at the bandwidth of interest and are constructed in a manner similar to the coatings 18 of the embodiments of FIGS. 2 and 3. The substrates 202 are both opaque and light-absorbing. Between the substrates is an air gap 208.

Light L enters the aperture I'' of the filter. Light at the bandwidth of interest is reflected upwardly by the upper reflective coating 206 of each substrate 202 to be again reflected by the lower coating 206 on the next higher substrate 202 back into the horizontal plane. The light is again reflected twice more to return to the horizontal plane and exit from the filter 200 through the output face O''. The light undergoes a total of four reflections. Light at undesired frequencies is transmitted through the coatings 206 to be absorbed by the opaque, light-absorbing substrates. Thus the filter of the embodiments of FIGS. 6 and 7 operates in substantially the same manner to isolate light as the bandwidth of interest as the filter 36 shown in FIG. 3.

In applications in the ultra-violet range there is a considerable saving in the cost of the materials required by using the air gap embodiment 200 of FIGS. 6 and 7 rather than the solid filter 36 of FIG. 3 because of the omission of the quartz support substrates 12. In applications where the reflecting layers will be exposed to a corrosive environment it is still advantageous to use the solid filter 36 because the reflective coatings 18 are protected from the atmosphere.

In a variation of the filter 200, the supporting substrates 202 are made of a material which will transmit light at the wavelength of interest and the reflective coatings 206 are deposited on the reverse side of the support substrates with respect to the incident and reflected light. Thus the light must first pass through the support layer to be reflected by the reflective coating. The support layer protects one surface of the reflective coating. The backside of the reflective coating is covered with an opaque, light-absorbing layer which also protects the other surface of the reflective coating in addition to absorbing nonreflected light of undesired frequencies.

Referring now to FIG. 8, there is shown still another embodiment, which is a modification of the embodiment of FIGS. 6 and 7. A plurality of parallel plane substrates 210, oriented in planes at angles of 45° to the vertical plane of the filter, are mounted in a case 204' and are separated by an air gap 212. The substrates 210 are transparent at the wavelength of interest. A reflective coating 214, of a type similar to the reflective coating 206, is deposited on the surface of each substrate 210 which faces the air gap 212. On each of the substrate surfaces facing away from the air gap are deposited similar reflective coatings 216. The reflective coatings 214 and 216 are reflective at the bandwidth of interest but pass light which is not of the bandwidth of interest to be absorbed by opaque, light-absorbing layers 218 on the side of each of the reflective coatings 216 opposite the substrate 210.

Light which enters the aperture of the filter is reflected first by the reflective coating 214 of the lower substrate up to the first reflective coating 214 of the upper substrate and back into the horizontal plane. The light of the bandwidth of interest which is not reflected by the first reflective coating 214 of the lower substrate passes through the substrate and is reflected substantially in total by the second reflective coating 216 up to either the first reflective coating 214 or the second reflective coating 216 of the next upper substrate, thereby returning the light to the horizontal plane.

The filter of the embodiment of FIG. 8 is utilized where a high degree of bandwidth isolation is required. Obtaining very narrow bandwidth reflection characteristics from the reflective coatings is primarily a factor of the number of layers of thin film which are deposited in each reflective coating.

It is also possible to make the reflective coatings 214 and 216 of different reflective characteristics in order to give some particularly desired shape to the band pass characteristics of the filter itself. For example the band pass characteristic may be broadened from that shown for the filter 36 in FIG. 4. The portion of the filter shown in FIG. 8 is only one-half of the overall filter which has a chevron or louvre design similar to that shown in FIGS. 3 and 7. Furthermore each of the coated substrates 210 would normally be cemented to another coated substrate 210. Thus the opaque, light-absorbing layer 218 would normally be a thin layer of epoxy cement.

In all the above described embodiments the substrates, the opaque, light-absorbing layers and the reflective coatings are shown as having exaggerated thicknesses for purposes of illustration. Typically in the embodiments of FIGS. 1 to 3 the dimension *d* is on the order of 40 thousand angstroms (40,000 A.) thick. Each layer of light-absorbing epoxy or other light absorbing coating is on the order ot one thousandth of an inch (0.001 inch) thick. In the embodiments described in reference to FIGS. 6, 7 and 8, the supporting substrates are each on the order of five to seven thousandths of an inch thick and the reflective coatings are on the order of 40 thousand angstroms thick, depending on the wavelength of interest. The air gap between reflective coatings is typically on the order of fourteen hundredths of an inch.

In all of the above embodiments the reflective surfaces have been described as being supported at an angle of 45° with respect to the incident beam of light. While the angle of 45° is a particularly efficient angle for the reflection of light energy in other embodiments of the invention angles of more or less than 45° may be used.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. A method of making an optical reflection filter for isolating a bandwidth of interest from an incident beam of light comprising the steps of assembling a plurality of transparent substrates, each substrate having a pair of spaced-apart, parallel plane surfaces, depositing a multi-layer, thin film coating, which is reflective at the bandwidth of interest and substantially transparent at other bandwidths, on the plane surfaces, applying thin layers of light-absorbing adhesive between each coated substrate and thereafter forming a plurality of such reflectively coated substrates together in a stack, and cutting slabs from the stack of substrates at a predetermined angle to the planes of the parallel plane surfaces of the substrate, the predetermined angle being sufficiently small so that a light ray of said beam entering a transparent substrate normal to a cut surface of the substrate will intersect at least one of the thin film coatings.

2. A method of making an optical reflection filter as recited in claim 1 further comprising the step of affixing two such slabs in a back-to-back relationship with the edges of the substrates of one slab in parallel alignment with the edges of the substrates of the other slab.

3. A method of making an optical reflection filter as recited in claim 1 wherein the step of cutting slabs from the stack of substrates comprises cutting the slabs at an angle of substantially forty-five degrees to the planes of the parallel, plane surfaces of the substrates.

* * * * *